(12) United States Patent
Brokenshire et al.

(10) Patent No.: US 6,624,810 B2
(45) Date of Patent: Sep. 23, 2003

(54) TIGHTENED BOUNDING VOLUMES FOR BSP-TREES

(75) Inventors: Daniel Alan Brokenshire, Round Rock, TX (US); Barry L. Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 09/740,526

(22) Filed: Dec. 18, 2000

(65) Prior Publication Data

US 2002/0075261 A1 Jun. 20, 2002

(51) Int. Cl.[7] .............................................. G06T 15/00
(52) U.S. Cl. .................................................... 345/420
(58) Field of Search ................................ 345/419, 420, 345/428, 619; 707/101, 102

(56) References Cited

U.S. PATENT DOCUMENTS

| 4,694,404 | A | * | 9/1987 | Meagher | 345/421 |
| 6,373,485 | B2 | * | 4/2002 | Sowizral et al. | 345/421 |
| 6,396,492 | B1 | * | 5/2002 | Frisken et al. | 345/420 |
| 6,400,846 | B1 | * | 6/2002 | Lin et al. | 382/199 |

* cited by examiner

*Primary Examiner*—Phu K. Nguyen
(74) *Attorney, Agent, or Firm*—Duke W. Yee; Mark E. McBurney; Lisa L. B. Yociss (57) ABSTRACT

A method, system, and computer program product for reducing a boundary of a subspace in a binary space partitioning tree is provided. In one embodiment a space containing an object for which an image is to be rendered and displayed to a user is divided into subspaces. The boundaries of each subspace are recalculated to remove at least a portion of the dead space from within the subspace. The recalculation is performed by analyzing the spatial extent of the object or objects within the each subspace and recalculating the boundaries of each subspace to be coextensive with the boundaries of the object or objects within the subspace.

21 Claims, 4 Drawing Sheets

| OBJECT | BEST APPROXIMATING POLYTOPE |
|---|---|
| [0..3] | [0..5] |
| [7..10] | [5..10] |

| OBJECT | BEST APPROXIMATING POLYTOPE |
|---|---|
| [0..3] | [0..3] |
| [7..10] | [7..10] |

TIGHTENED BOUNDING VOLUMES FOR BSP-TREES

CROSS REFERENCE TO RELATED APPLICATION

The present application is related to co-pending U.S. patent application Ser. No. 09/740,525 (Client Docket No. AUS9-2000-0450-US1) entitled "A METHOD AND APPARATUS USING PRIMITIVE BOUNDING VOLUMES TO IMPROVE THE ACCURACY OF BSP-TREES" filed Dec. 18, 2000. The content of the above mentioned commonly assigned, co-pending U.S. patent application is hereby incorporated herein by reference for all purposes.

BACKGROUND OF THE INVENTION

1. Technical Field

The present invention relates generally to an improved graphics subsystem and in particular to a method and an apparatus for processing binary space partitioning (BSP) trees. Still more particularly, the present invention provides a method and an apparatus for improving the accuracy of the bounding volumes for BSP-trees.

2. Description of the Related Art

The display of three dimensional graphic images of complex scenes in real time have improved greatly as hardware and software have improved. These images are very complex, so efficient processing is of utmost importance. Binary space partitioning (BSP) trees were introduced in the early 1980's (See Fuchs, Kedem, and Nayor "On Visible Surface Generation by A Priori Tree Structures", SIGGRAPH '80, pp. 124–133, the content of which is hereby incorporated by reference for all purposes) to aid in the processing of 3-D scenes.

BSP trees are a standard tool in image processing and are continually being improved through refinement. A BSP tree divides an n-dimensional space into two components using an n-1 dimensional object. For example, a 0 dimensional point on a line divides the 1 dimensional line into two components. Alternatively, a 1 dimensional line divides a 2 dimensional plane into two components. For a 3 dimension scene, a 2 dimensional plane divides the scene into two components.

The process of subdivision continues recursively to subdivide an n-dimensional space into smaller components called polytopes. A polytope is a generalization of a polyhedron. Informally, it is a multi-dimensional solid with flat sides. The faces are the hyper-planes that are subdividing the n-dimensional space. Storing these polytopes in a BSP tree allows the n-dimensional space to be classified and sorted in a manner that assists in carrying out other processing tasks, such as hidden surface removal.

Polytopes can approximate objects in the n-dimensional space. Therefore, it would be advantageous to have improved bounding volumes in a BSP tree to make graphics processing more accurate.

SUMMARY OF THE INVENTION

The present invention provides a method, system, and computer program product for reducing a boundary of a subspace in a binary space partitioning tree. In one embodiment a space containing an object for which an image is to be rendered and displayed to a user is divided into subspaces. The boundaries of each subspace are recalculated to remove at least a portion of the dead space from within the subspace. The recalculation is performed by analyzing the spatial extent of the object or objects within the each subspace and recalculating the boundaries of each subspace to be coextensive with the boundaries of the object or objects within the subspace.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
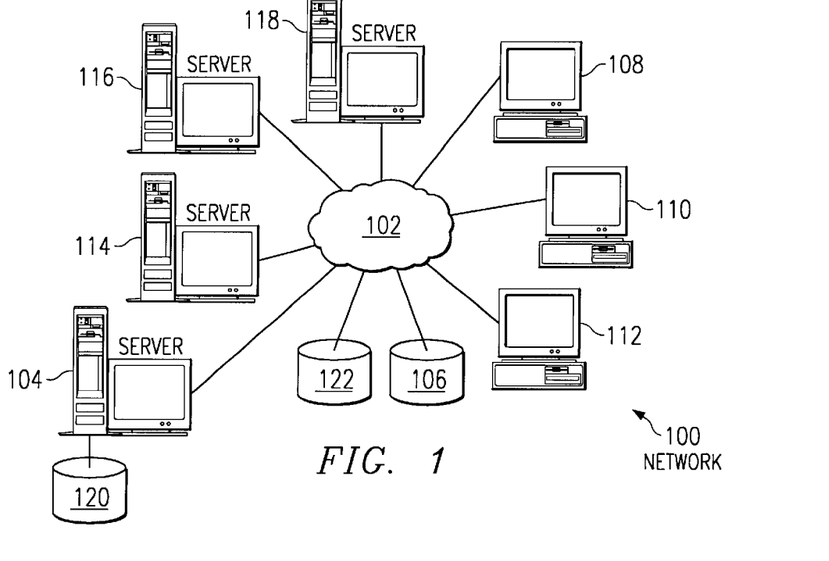
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. The present invention works locally on a particular machine, such as client 108, to improve the processing of graphic images. The source of these images may be network 102, such as an interactive game being played on the network.

Figure 2:
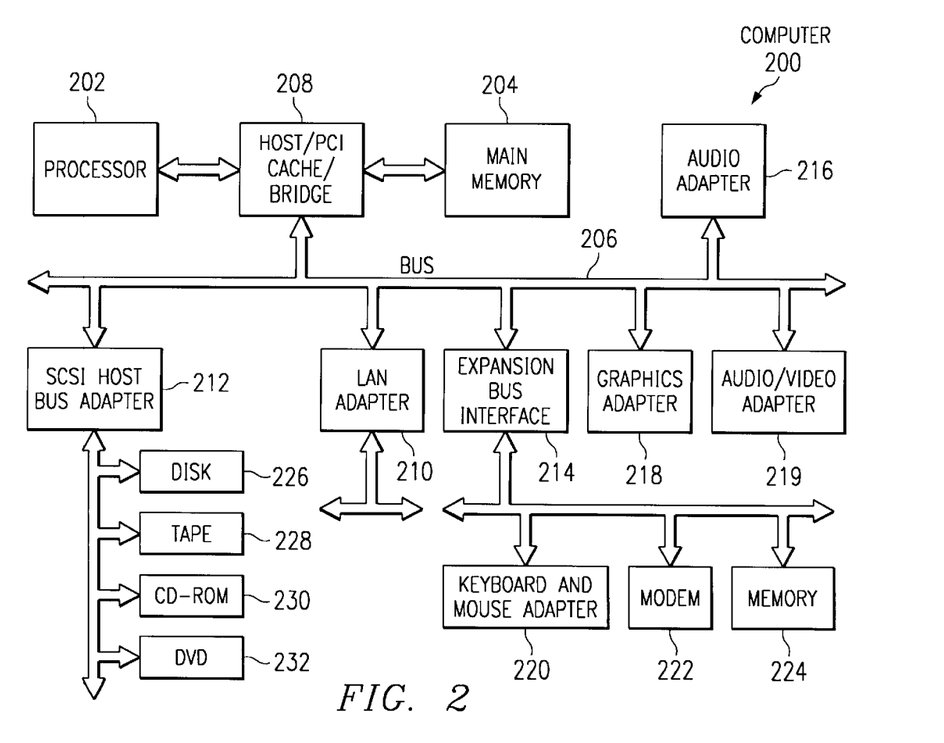
FIG. 2 is a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. The hardware and software to support the present invention would commonly be found on graphics adapter 218.

Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3A:
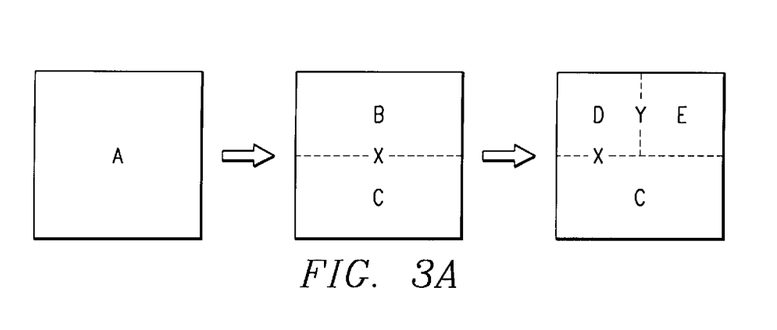
FIG. 3A shows a two dimensional space subdivided by "hyperplanes" to form subspaces.

A BSP-tree is best introduced using a simple example. FIG. 3A shows a two dimensional object, plane A, that is divided into subplanes B and C by the line X. Line X is a one dimensional example of a hyper-plane that divides an 2-dimensional space into two components. In the right hand image, the subplane B is further subdivided into the subplanes D and E by the line Y. From a more general perspective, in the right hand image there are three polytopes, C, D, and E, formed by two hyperplanes, X and Y.

Figure 3B:
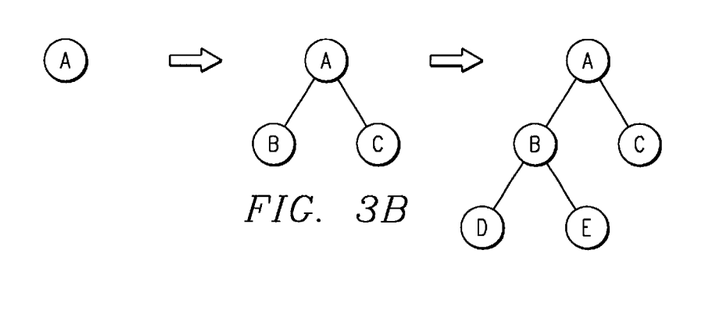
FIG. 3B shows the BSP tree constructed based on the subdivisions in FIG. 3A.

FIG. 3B shows the BSP tree constructed as a result of subdividing the 2-dimensional plane in FIG. 3A. The left hand tree has a single node, A, representing the entire space. Space A is divided into subspaces B and C by hyperplane X, so the two subspaces, B and C, become children of the node A, as seen in the tree in the middle.

Every time a space is subdivided by a hyperplane, the children of the node are the two subspaces that are formed. So when hyperplane Y divides subspace B into components D and E, the node B in the BSP tree now has children D and E. This process continues as the original space is recursively subdivided into smaller and smaller polytopes.

As one of ordinary skill in the art will appreciate, the discussion above with a two dimensional space being subdivided by a one dimensional line can be extended to higher dimensions, such as 3D space being subdivided by 2D planes. This example can also be simplified to a one dimensional line being subdivided by a zero dimensional point, as shown in the next sequence of figures.

Figure 4A:
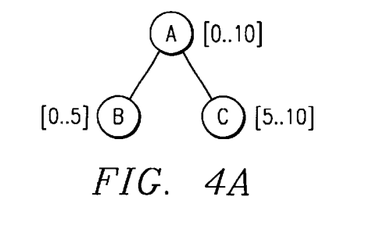
FIG. 4A shows a one dimensional space subdivided by points to form subspaces.

In FIG. 4A, the entire "space" is the one dimensional line segment A from 0 to 10. The midpoint at position 5 divides this space into subspaces B from 0 to 5 and C from 5 to 10. As one of ordinary skill in the art will appreciate, any point, not just the midpoint, would divide the original segment into two components.

Given a partitioning of the original space into arbitrary objects, the problem we face is to find the polytope that best approximates each object. A "best" approximation of a object means a polytope that fully includes the object and has the least additional space outside the object. This is best understood by example.

Figure 4B:
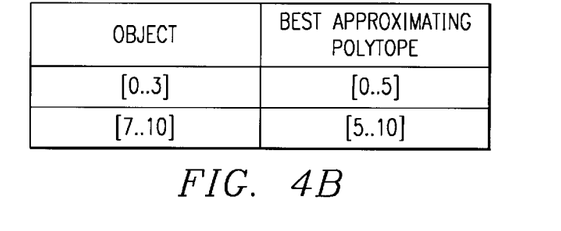
FIG. 4B shows the best approximating subspaces for a set of objects based on the subspaces in FIG. 4A.

In FIG. 4B, the space 0 to 10 has been partitioned into two objects, the line segments [0 . . . 3] and [7 . . . 10]. There are three polytopes available to act as approximations for these objects: A from [0 . . . 10], B from [0 . . . 5], and C from [5 . . . 10]. The best approximation of object [0 . . . 3] is polytope B and the best approximation of object [7 . . . 10] is polytope C. This invention addresses the problem of the poor fit of these approximations.

In the prior art, a BSP tree is formed as each space in the tree is subdivided into two subspaces by a hyperplane. These two subspaces are non-overlapping and their union form the original space. There are two basic approaches to deciding on the location of the hyperplanes dividing the space into subspaces. In the first approach, the hyperplanes are chosen so as to best fit the objects in the image. This is a computationally expensive approach and, despite the computational effort, the result will not be optimal due to the complexity of the image, particularly when a 3-dimensional image is considered. The second approach is to select the hyperplanes in a computationally efficient manner, such as using the midpoint of a line segment. After the BSP tree is built, when it is detected that an object does not fit into an existing subspace well, corrective actions are taken to improve the BSP tree. This invention uses the second approach and it is the "corrective actions" that are the central idea of the invention.

In the present invention, the formation of a BSP tree is modified in a significant way. The child polytopes of a parent node don't have to cover the entire space of the parent node. The significance of this change can be appreciated by reexamining the example from FIG. 4. The objects in that example were the intervals [0 . . . 3] and [7 . . . 10]. Notice that the interval [3 . . . 7] is "dead space."

Figure 5A:
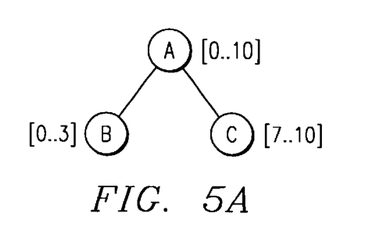
FIG. 5A shows a one dimensional space subdivided by points to form subspaces with tighter bounds in accordance with a preferred embodiment of the invention.
Figure 5B:
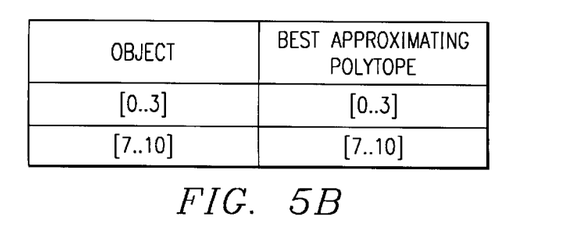
FIG. 5B shows the best approximating subspaces for a set of objects based on the subspaces in FIG. 5A in accordance with a preferred embodiment of the invention.

In FIG. 5A, a BSP tree is formed by partitioning the line segment A [0 . . . 10] into the two segments B [0 . . . 3] and C [7 . . . 10]. Notice that the union of B and C does not cover all of A. FIG. 5B has the same three objects as FIG. 4B. There are three polytopes available to act as approximations for these objects: A [0 . . . 10], B [0 . . . 3], and C [7 . . . 10]. As shown in the right hand column of the table, the best approximation for [0 . . . 3] is B and the best approximation for [7 . . . 10] is C. In fact, both these approximations are "perfect fits."

Figure 6A:
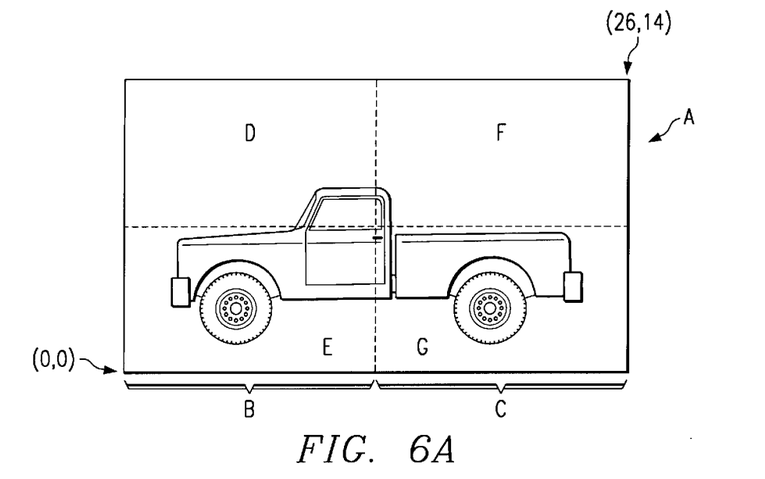
FIG. 6A shows a two dimensional space containing an image of a pickup truck subdivided by lines to form subspaces.

For a more realistic example, FIG. 6A shows a two dimensional plane A containing an image of a pickup truck. The plane A is subdivided vertically to form subplanes B and C. The subplane B is subdivided horizontally to form the subplanes D and E. In a similar manner, the subplane C is subdivided horizontally to form the subplanes F and G. These polytopes are formed in a computationally efficient manner by bisecting each plane in the opposite direction of the previous bisection. This approach is simple but does not take into consideration the image being displayed.

A coordinate system is indicated in FIG. 6A with the lower left corner of A having a value of (0,0) and the upper right corner having a value of (26, 14). This means the plane is 26 units wide and 14 units high. As one of ordinary skill in the art will appreciate, the pixel coordinates on a screen image will be much larger than these values, but this smaller set of values is adequate to illustrate the invention.

Figure 6B:
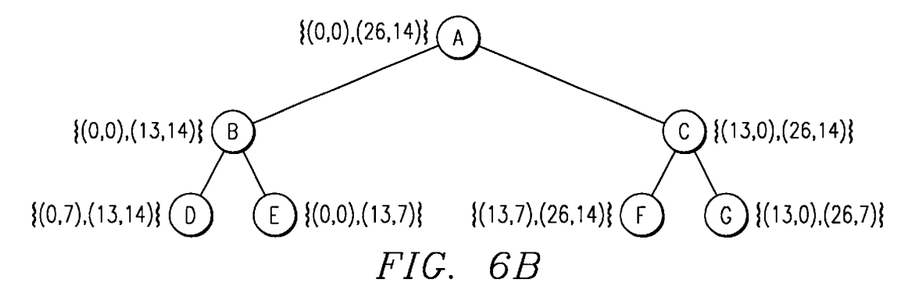
FIG. 6B shows the BSP tree constructed based on the subspaces in FIG. 6A.

FIG. 6B shows the BSP tree constructed based on the subspaces in FIG. 6A. The plane A is the root of the tree and its two subplanes B and C are the children of node A. In a similar manner, nodes D and E are children of node B and nodes F and G are children of node C. The position of each subplane is given in the form of the coordinates for the lower left corner and the coordinates of the upper right corner. So the position of plane A is specified by $\{(0, 0), (26, 14)\}$. The positions for all the other nodes in the tree are given on the figure.

Figure 7A:
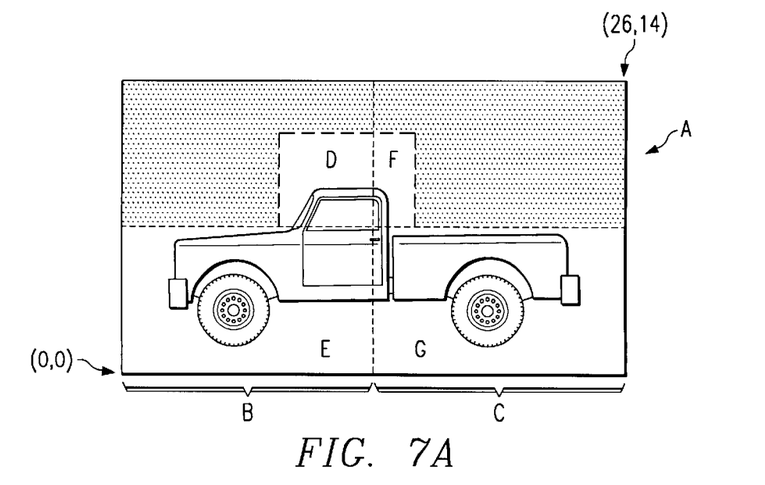
FIG. 7A shows a two dimensional space containing an image of a pickup truck subdivided by lines to form subspaces with selected subspaces tightened for a better approximation in accordance with a preferred embodiment of the invention.

FIG. 7A shows the same two dimensional space containing an image of a pickup truck as in FIG. 6A. The same initial subplanes, A through G, are formed by recursively subdividing subspaces. It is discovered that subplane D has a lot of "dead space"; this means the plane has a large area that does not overlap the image of the pickup truck. Subplane D can be reduced in size, as shown in FIG. 7A, and still cover the image of the pickup truck. In a similar manner, subplane F can be reduced in size substantially and still cover the image of the pickup truck.

Figure 7B:
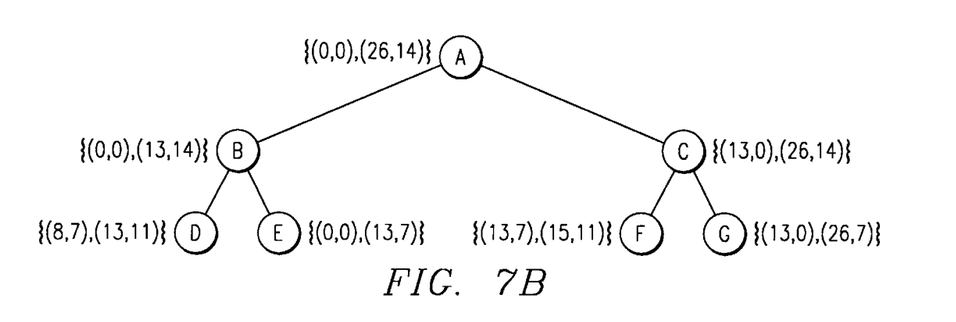
FIG. 7B shows the BSP tree constructed based on the subspaces in FIG. 7A in accordance with a preferred embodiment of the invention.

FIG. 7B shows the BSP tree constructed based on the subspaces in FIG. 7A in accordance with a preferred embodiment of the invention. The tree has the same structure as that shown in FIG. 6B, but the sizes of the subplanes D and F have been reduced. In particular, the size of D is reduced from a 13×7 unit rectangle to a 5×4 rectangle positioned from (8, 7) to (13, 11). The units can be any type of units, however for purposed of the present description, the units will be omitted for simplicity. The size of F is reduced from a 13×7 rectangle to a 2×4 rectangle positioned from (13, 7) to (15, 11).

Figure 8:
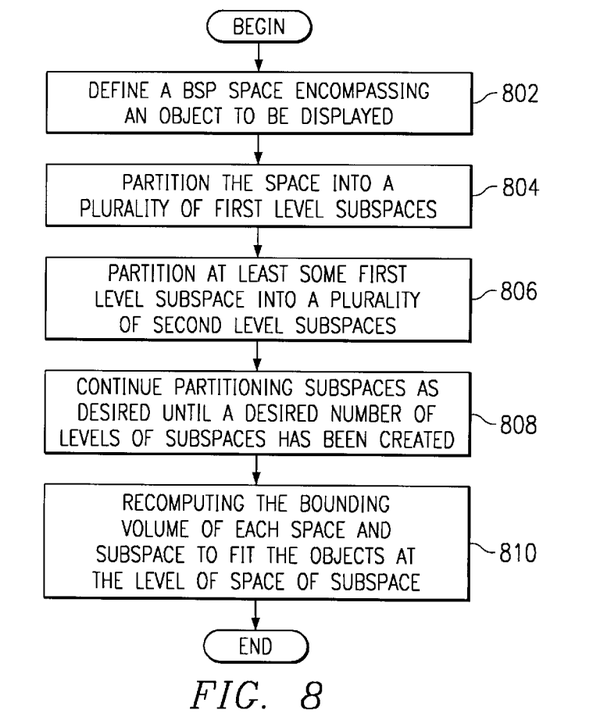
FIG. 8 depicts a flowchart illustrating an exemplary process and program flow for determining which subspaces should have their bounds tightened and the values of the tightened bounds in accordance with the present invention.

With reference now to FIG. 8, a flowchart illustrating an exemplary process and program flow for determining which subspaces should have their bounds tightened and the values of the tightened bounds is depicted in accordance with the present invention. This process may be performed on a server, such as, for example, server 104 in FIG. 1, with the results transmitted to a client, such as, for example, client 108 in FIG. 1, to be displayed on the client. First, a space, or root node, within a binary space partitioning tree is created for an object for which an image is to be rendered (step 802). The space should include the entire bounds of the object that is to be rendered and displayed. Next, the space partitioned into a plurality of first level subspaces to create child nodes or child subspaces (step 804). Each first level subspace may then partitioned into a plurality of second level subspaces (step 806). However, each subspace does not necessarily need to be subdivided further and some subspaces may be subdivided to more levels than others as determined by the requirements of the object that is to be rendered.

The rendering program then continues partitioning each subspace, if desired, such that at each level, each subspace is partitioned into further subspaces until a desired number of levels of subspaces has been created. (step 808). For three dimensions, each subspace may be a rectangular solid or some other polyhedron for which a space may be completely mapped without gaps that do not fall within any subspace. However, rectangular solids provide the simplest and easiest to use subspace. In two dimensions, the subspace may be rectangular as illustrated in FIGS. 6A and 7A, or some other polygon, again with the caveat that subspaces must be of a shape that the entire plane could be mapped without any gaps in the space that fall within an area not contained within any of the subspaces. However, it should be noted, that the entire space may not be mapped by the sum of the reduced subspaces as described herein, since such area may contain no information about the object whose image is to be rendered and displayed.

Once the space has been subdivided into a predetermined number of level of subspaces, the bounding volume of each space or subspace is recomputed such that the bounding volume just contains the object or objects that fit into that level of the BSP tree (step 810). Thus, the dead space at each level of the BSP is reduced by this recalculation of the bounding volume. This recalculation of the bounding volume may be accomplished by analyzing the values of the primitives that define the object, for which an image will be rendered and displayed to a user, and reducing the bounds of the subspace to include an area whose bounds are determined by the extent of the primitives contained within the unreduced subspace.

Therefore, for example, the of the object defining the portion of the pickup truck in subspace D in FIG. 6A are analyzed to reduce the subspace D from bounds of {(0.7), (13,14)} to bounds of {(8,7), (13,11)} in FIG. 7A. Thus, for example, if the image of the pickup truck is moved around on the display to the right such that portions of the unreduced subspace D are outside the viewable area of the screen but portions the subspace D are contained within the viewable area, no useable information will have been gathered since, if a portion of the subspace D is contained within the visible area of the display, the entire image of the portion of the object within subspace D will need to be rendered, because at this level of subspaces, no usable information can be determined about subspace D. However, with the boundaries as determined using the present invention, if the image of the pickup truck were moved to the right to such an extent that the entire reduced subspace D as shown in FIG. 7A is removed from the viewable area of the display, the rendering program is able to determine that it does not need to render the contents of reduced subspace D since that portion of the image will not be displayed. Therefore, the program needs only to render the image in subspace E, a task which requires much less bus traffic between memory or an I/O device and the processor and which requires much less computations. Thus, the rendering and displaying of an image may be performed more quickly by reducing the bounding values of a subspace in accordance with the present invention.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed:

1. A method in a distributed data processing system for reducing a boundary of a subspace in a binary space partitioning tree, the method comprising the data processing system implemented steps of:

dividing a space containing an object for which an image is to be rendered and displayed to a user, into subspaces, wherein the subspaces together occupy the entire space and are equal-sized, non-overlapping subspaces; and reducing the boundaries of each subspace to remove at least a portion of the dead space from within the subspace, wherein after the boundaries have been reduced the subspaces together do not occupy all of the space, and wherein the subspaces are no longer equal-sized.

2. The method as recited in claim 1, wherein the calculating step comprises analyzing primitives of a portion of the object contained within the subspace to determine a spatial extent and the reducing step comprises reducing the values of the boundaries of the subspace to a value that is coextensive with a maximal spatial extent of the primitives in each direction defining the subspace.

3. The method as recited in claim 1, wherein the calculating step comprises analyzing primitives of a portion of the object contained within the subspace to determine a spatial extent and the reducing step comprises reducing the values of the boundaries of the subspace to a value that is large enough to encompass a maximal spatial extent of the primitives in each direction defining the subspace.

4. The method as recited in claim 1, wherein the space is three dimensional and the subspace shape comprises a polyhedron.

5. The method as recited in claim 4, wherein the polyhedron is a rectangular solid.

6. The method as recited in claim 1, wherein the space is two dimensional and the subspace is a polygon.

7. The method as recited in claim 6, wherein the polygon is a rectangle.

8. A computer program product in a computer readable media for use in a distributed data processing system for reducing a boundary of a subspace in a binary space partitioning tree, the computer program product comprising the data processing system implemented steps of:

first instructions for dividing a space containing an object for which an image is to be rendered and displayed to a user, into subspaces, wherein the subspaces together occupy the entire space and are equal-sized, non-overlapping subspaces; and second instructions for reducing the boundaries of each subspace to remove at least a portion of the dead space from within the subspace, wherein after the boundaries have been reduced the subspaces together do not occupy all of the space, and wherein the subspaces are no longer equal-sized.

9. The computer program product as recited in claim 8, wherein the second instructions comprise analyzing primitives of a portion of the object contained within the subspace to determine a spatial extent and the reducing step comprises reducing the values of the boundaries of the subspace to a value that is coextensive with a maximal spatial extent of the primitives in each direction defining the subspace.

10. The computer program product as recited in claim 8, wherein the second instructions comprise analyzing primitives of a portion of the object contained within the subspace to determine a spatial extent and the reducing step comprises reducing the values of the boundaries of the subspace to a value that is large enough to encompass a maximal spatial extent of the primitives in each direction defining the subspace.

11. The computer program product as recited in claim 8, wherein the space is three dimensional and the subspace shape comprises a polyhedron.

12. The computer program product as recited in claim 11, wherein the polyhedron is a rectangular solid.

13. The computer program product as recited in claim 8, wherein the space is two dimensional and the subspace is a polygon.

14. The computer program product as recited in claim 13, wherein the polygon is a rectangle.

15. A system for reducing a boundary of a subspace in a binary space partitioning tree, the system comprising the data processing system implemented steps of:

first means for dividing a space containing an object for which an image is to be rendered and displayed to a user, into subspaces, wherein the subspaces together occupy the entire space mid are equal-sized, non-overlapping subspaces; and second means for reducing the boundaries of each subspace to remove at least a portion of the dead space from within the subspace, wherein after the boundaries have been reduced the subspaces together do not occupy all of the space, and wherein the subspaces are no longer equal-sized.

16. The system as recited in claim 15, wherein the second means comprise analyzing primitives of a portion of the object contained within the subspace to determine a spatial extent and the reducing step comprises reducing the values of the boundaries of the subspace to a value that is coextensive with a maximal spatial extent of the primitives in each direction defining the subspace.

17. The system as recited in claim 15, wherein the second means comprise analyzing primitives of a portion of the object contained within the subspace to determine a spatial extent and the reducing step comprises reducing the values of the boundaries of the subspace to a value that is large enough to encompass a maximal spatial extent of the primitives in each direction defining the subspace.

18. The system as recited in claim 15, wherein the space is three dimensional and the subspace shape comprises a polyhedron.

19. The system as recited in claim 18, wherein the polyhedron is a rectangular solid.

20. The system as recited in claim 15, wherein the space is two dimensional and the subspace is a polygon.

21. The system as recited in claim 20, wherein the polygon is a rectangle.

* * * * *

UNITED STATES PATENT AND TRADEMARK OFFICE
CERTIFICATE OF CORRECTION

| | |
|---|---|
| PATENT NO. | : 6,624,810 B2 |
| APPLICATION NO. | : 09/740526 |
| DATED | : September 23, 2003 |
| INVENTOR(S) | : Brokenshire et al. |

It is certified that error appears in the above-identified patent and that said Letters Patent is hereby corrected as shown below:

Col. 9, line 4: after "space" delete "mid" and insert --and--.

Signed and Sealed this

First Day of May, 2007

JON W. DUDAS
*Director of the United States Patent and Trademark Office*